(12) United States Patent
Bae et al.

(10) Patent No.: US 12,382,007 B2
(45) Date of Patent: Aug. 5, 2025

(54) IMAGE CONVERSION APPARATUS AND METHOD

(71) Applicant: ELECTRONICS AND TELECOMMUNICATIONS RESEARCH INSTITUTE, Daejeon (KR)

(72) Inventors: Seong-Jun Bae, Daejeon (KR); Jung-Won Kang, Daejeon (KR); Soo-Woong Kim, Sejong-si (KR); Gun Bang, Daejeon (KR); Jin-Ho Lee, Daejeon (KR); Ha-Hyun Lee, Seoul (KR); Sung-Chang Lim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 424 days.

(21) Appl. No.: 17/981,426

(22) Filed: Nov. 6, 2022

(65) Prior Publication Data

US 2023/0171390 A1    Jun. 1, 2023

(30) Foreign Application Priority Data

Nov. 30, 2021 (KR) .................. 10-2021-0169070
Sep. 14, 2022 (KR) .................. 10-2022-0115402

(51) Int. Cl.
*H04N 13/161* (2018.01)
*H04N 13/00* (2018.01)
(Continued)

(52) U.S. Cl.
CPC ......... *H04N 13/161* (2018.05); *H04N 19/187* (2014.11); *H04N 19/30* (2014.11); *H04N 2013/0077* (2013.01)

(58) Field of Classification Search
CPC .... H04N 13/161; H04N 19/187; H04N 19/30; H04N 2013/0077
See application file for complete search history.

(56) References Cited

U.S. PATENT DOCUMENTS

2021/0383122 A1    12/2021  Jeong et al.
2021/0409726 A1*   12/2021  Shin ..................... H04N 19/186
(Continued)

FOREIGN PATENT DOCUMENTS

KR    10-2021-0089068 A    7/2021
KR    10-2021-0151684 A    12/2021

OTHER PUBLICATIONS

Tinghui Zhou et al., "Stereo Magnification: Learning view synthesis using multiplane images", arXiv:1805.09817v1 [cs.CV], May 24, 2018.
(Continued)

*Primary Examiner* — Jae N Noh
(74) *Attorney, Agent, or Firm* — LRK PATENT LAW FIRM (57) ABSTRACT

Disclosed herein are an image compression apparatus and method. The image conversion method includes generating a multi-plane image reconfigured into layers in a depth direction based on multiple pieces of multi-view image data, generating an aggregated layer by aggregating the layers of the multi-plane image into at least one layer, and converting a multi-plane image including the aggregated layer into a two-dimensional (2D) atlas image.

16 Claims, 8 Drawing Sheets

(51) Int. Cl.
*H04N 19/187* (2014.01)
*H04N 19/30* (2014.01)

(56) References Cited

U.S. PATENT DOCUMENTS

| | | | |
|---|---|---|---|
| 2022/0007000 A1 | 1/2022 | Lee et al. | |
| 2022/0030184 A1 | 1/2022 | Overbeck | |
| 2023/0186522 A1* | 6/2023 | Dore | H04N 19/21 |
| | | | 345/419 |
| 2023/0379495 A1* | 11/2023 | Fleureau | H04N 19/597 |

OTHER PUBLICATIONS

Michael Broxton et al., "Immersive Light Field Video with a Layered Mesh Representation", ACM Transactions on Graphics, vol. 39, Issue 4, Aug. 12, 2020.

* cited by examiner

IMAGE CONVERSION APPARATUS AND METHOD

CROSS REFERENCE TO RELATED APPLICATIONS

This application claims the benefit of Korean Patent Application Nos. 10-2021-0169070, filed Nov. 30, 2021, and 10-2022-0115402, filed Sep. 14, 2022, which are hereby incorporated by reference in their entireties into this application.

BACKGROUND OF THE INVENTION

1. Technical Field

The present invention relates generally to a method and apparatus for converting multi-plane three-dimensional (3D) data into a two-dimensional (2D) atlas image.

2. Description of Related Art

Generally, multi-plane 3D data (i.e., a multi-plane image: MPI) is a 3D space representation method of reconfiguring a 3D space into layers in a depth direction and locating pixels in a space on a surface in the depth direction.

An MPI-based space representation method may obtain a relatively high image quality when freely rendering a space at an arbitrary view, and may not require high-quality depth information, which is the most important element in maintaining image quality when photorealistic space information is represented. Accordingly, such an MPI-based space representation method has been variously used as a new 3D photorealistic space representation method.

In order to convert a conventional multi-plane image into a 2D atlas image, patch regions (regions in which an actual pixel is present) present in each layer image of the multi-plane image are gathered in one 2D atlas image. However, this conversion scheme is problematic in that the size of a 2D atlas image is greatly increased and a larger number of empty spaces, in which no patch region is contained in a 2D atlas image, occur, thus deteriorating compression efficiency.

SUMMARY OF THE INVENTION

Accordingly, the present invention has been made keeping in mind the above problems occurring in the prior art, and an object of the present invention is to provide an image conversion method and apparatus, which can reduce the size of a 2D atlas image when multi-plane 3D data (multi-plane image) is converted into the 2D atlas image.

Another object of the present invention is to provide an image conversion method and apparatus, which can improve the compression efficiency of a 2D atlas image.

In accordance with an aspect of the present invention to accomplish the above objects, there is provided an image conversion method, including generating a multi-plane image reconfigured into layers in a depth direction based on multiple pieces of multi-view image data, generating an aggregated layer by aggregating the layers of the multi-plane image into at least one layer, and converting a multi-plane image including the aggregated layer into a two-dimensional (2D) atlas image.

Generating the aggregated layer may include generating a first aggregated layer from pixels that are seen first for respective identical pixel coordinates when an origin of a camera is viewed from a deepest layer among the layers, and generating a second aggregated layer from pixels that are seen first for respective identical pixel coordinates, with exception of pixels included in the first aggregated layer, when the origin of the camera is viewed from a second-deepest layer among the layers.

Generating the aggregated layer may be terminated when no pixel is present in each of the layers.

The 2D atlas image may include a transparency image and a color image, which are generated based on pixel information of respective aggregated layers of the multi-plane image, and a layer index image having position information of the pixels on the layers.

The image conversion method may further include compressing the 2D atlas image.

Bitstream data may be generated from the 2D atlas image using at least one of High Efficiency Video Coding (HEVC), H.263 or Versatile Video Coding (VVC), or a combination thereof.

The multiple pieces of multi-view image data may include image data having a 2D array.

The multi-plane image may be generated by generating planes for respective distances in a depth direction and rearranging corresponding pixel values and transparency values of pixels, for respective planes.

In accordance with another aspect of the present invention to accomplish the above objects, there is provided an image conversion apparatus, including memory configured to store a control program for image conversion, and a processor configured to execute the control program stored in the memory, wherein the processor is configured to generate a multi-plane image reconfigured into layers in a depth direction based on multiple pieces of multi-view image data, generate an aggregated layer by aggregating the layers of the multi-plane image into at least one layer, and convert a multi-plane image including the aggregated layer into a two-dimensional (2D) atlas image.

The processor may be configured to generate a first aggregated layer from pixels that are seen first for respective identical pixel coordinates when an origin of a camera is viewed from a deepest layer among the layers and to generate a second aggregated layer from pixels that are seen first for respective identical pixel coordinates, with exception of pixels included in the first aggregated layer, when the origin of the camera is viewed from a second-deepest layer among the layers.

The processor may be configured to terminate generation of the aggregated layer when no pixel is present in each of the layers.

The 2D atlas image may include a transparency image and a color image, which are generated based on pixel information of respective aggregated layers of the multi-plane image, and a layer index image having position information of the pixels on the layers.

The processor may be configured to compress the 2D atlas image.

The processor may be configured to generate bitstream data from the 2D atlas image using at least one of High Efficiency Video Coding (HEVC), H.263 or Versatile Video Coding (VVC), or a combination thereof.

The multiple pieces of multi-view image data may include image data having a 2D array.

The processor is configured to generate the multi-plane image by generating planes for respective distances in a depth direction and rearranging corresponding pixel values and transparency values of pixels, for respective planes.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Advantages and features of the present invention and methods for achieving the same will be clarified with reference to embodiments described later in detail together with the accompanying drawings. However, the present invention is capable of being implemented in various forms, and is not limited to the embodiments described later, and these embodiments are provided so that this invention will be thorough and complete and will fully convey the scope of the present invention to those skilled in the art. The present invention should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present invention.

The terms used in the present specification are merely used to describe embodiments, and are not intended to limit the present invention. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present invention pertains. Further, terms defined in generally used dictionaries are not to be interpreted as having ideal or excessively formal meanings unless they are definitely defined in the present specification.

In the present specification, each of phrases such as "A or B", "at least one of A and B", "at least one of A or B", "A, B, or C", "at least one of A, B, and C", and "at least one of A, B, or C" may include any one of the items enumerated together in the corresponding phrase, among the phrases, or all possible combinations thereof.

Embodiments of the present invention will now be described in detail with reference to the accompanying drawings. Like numerals refer to like elements throughout, and overlapping descriptions will be omitted.

Figure 1:
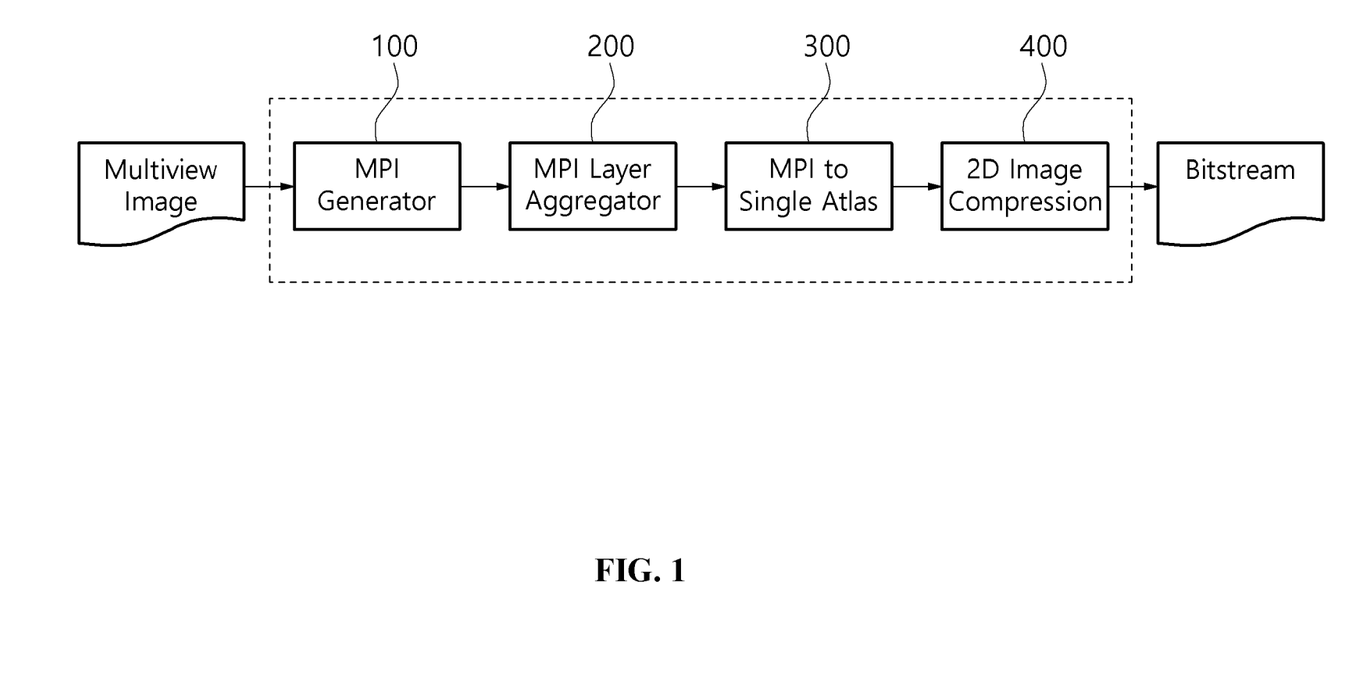
FIG. 1 is a block diagram illustrating an image conversion apparatus according to an embodiment.

FIG. 1 is a block diagram illustrating an image conversion apparatus according to an embodiment.

Referring to FIG. 1, the image conversion apparatus according to the embodiment may include a multi-plane 3D data (multi-plane image: MPI) generator 100, an MPI layer aggregator 200, a 2D atlas image converter 300, and a 2D image compressor 400.

The MPI generator 100 may receive multi-view image data and may then generate a multi-plane image (MPI). The multi-view image data may be image data having M×N 2D arrays or having N one-dimensional (1D) arrays. In an embodiment, the image data having 2D arrays may be used.

The MPI generator 100 may generate the multi-plane image by reconfiguring the multi-view image data into layers in a depth direction.

The MPI layer aggregator 200 may generate an aggregated layer by aggregating MPI layers into at least one layer.

The 2D atlas image converter 300 may convert the MPI including the aggregated layer into a 2D atlas image. The 2D atlas image converter 300 may generate the 2D atlas image by rearranging regions in which a pixel is present on all layers of the multi-plane image (MPI) into one image.

The 2D image compressor 400 may generate bitstream data from the 2D atlas image using one of compression methods such as High Efficiency Video Coding (HEVC), H.263, and Versatile Video Coding (VVC).

Figure 2:
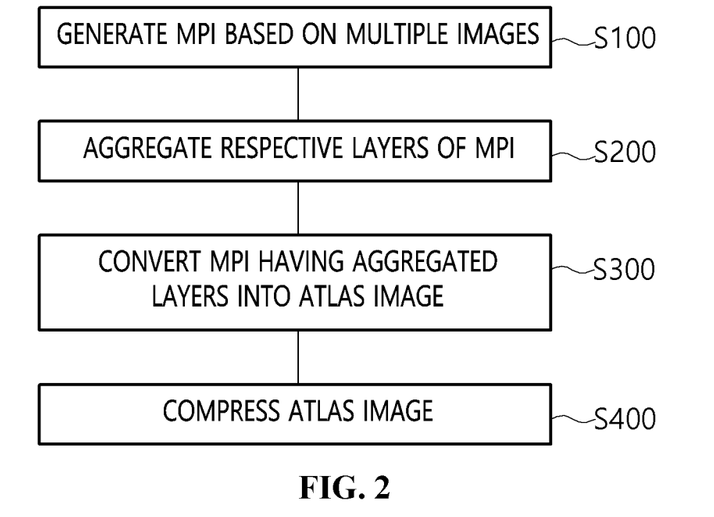
FIG. 2 is a flowchart illustrating an image conversion method according to an embodiment.

FIG. 2 is a flowchart illustrating an image conversion method according to an embodiment. Here, the image conversion method according to the embodiment may be performed by the image conversion apparatus.

Referring to FIG. 2, the image conversion apparatus according to the embodiment may generate a multi-plane image reconfigured into layers in a depth direction based on multiple pieces of multi-view image data at step S100.

Figure 3:
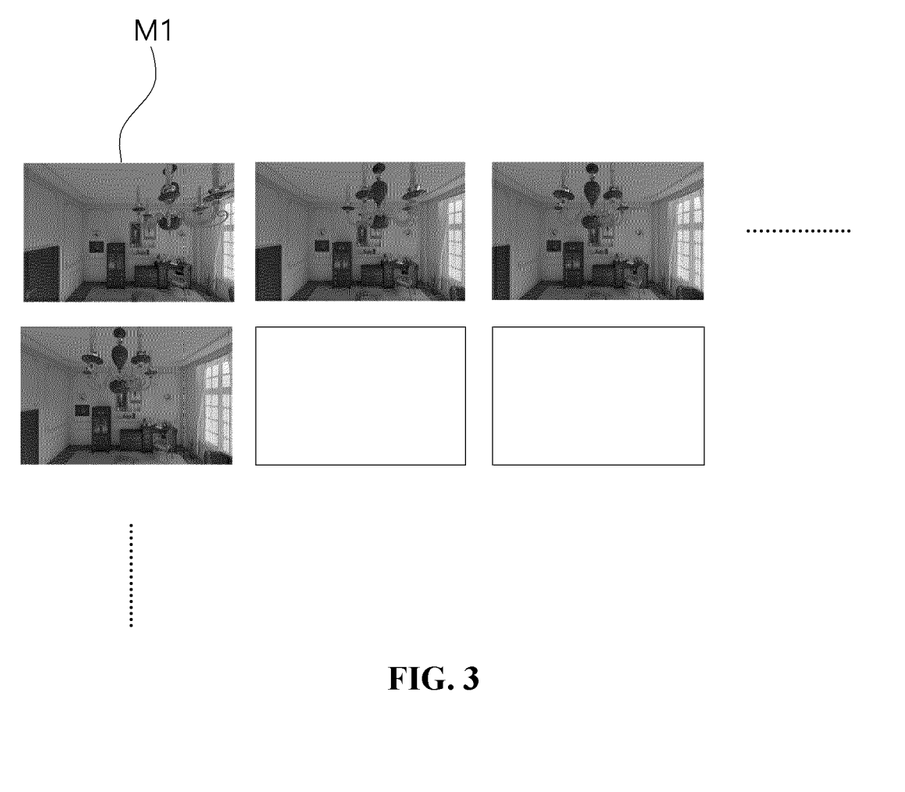
FIG. 3 is a diagram illustrating multi-view image data according to an embodiment.

FIG. 3 is a diagram illustrating multi-view image data according to an embodiment.

As illustrated in FIG. 3, multi-view image data M1 may be captured from a 2D camera array, and may be an image acquired at various view positions.

Figure 4:
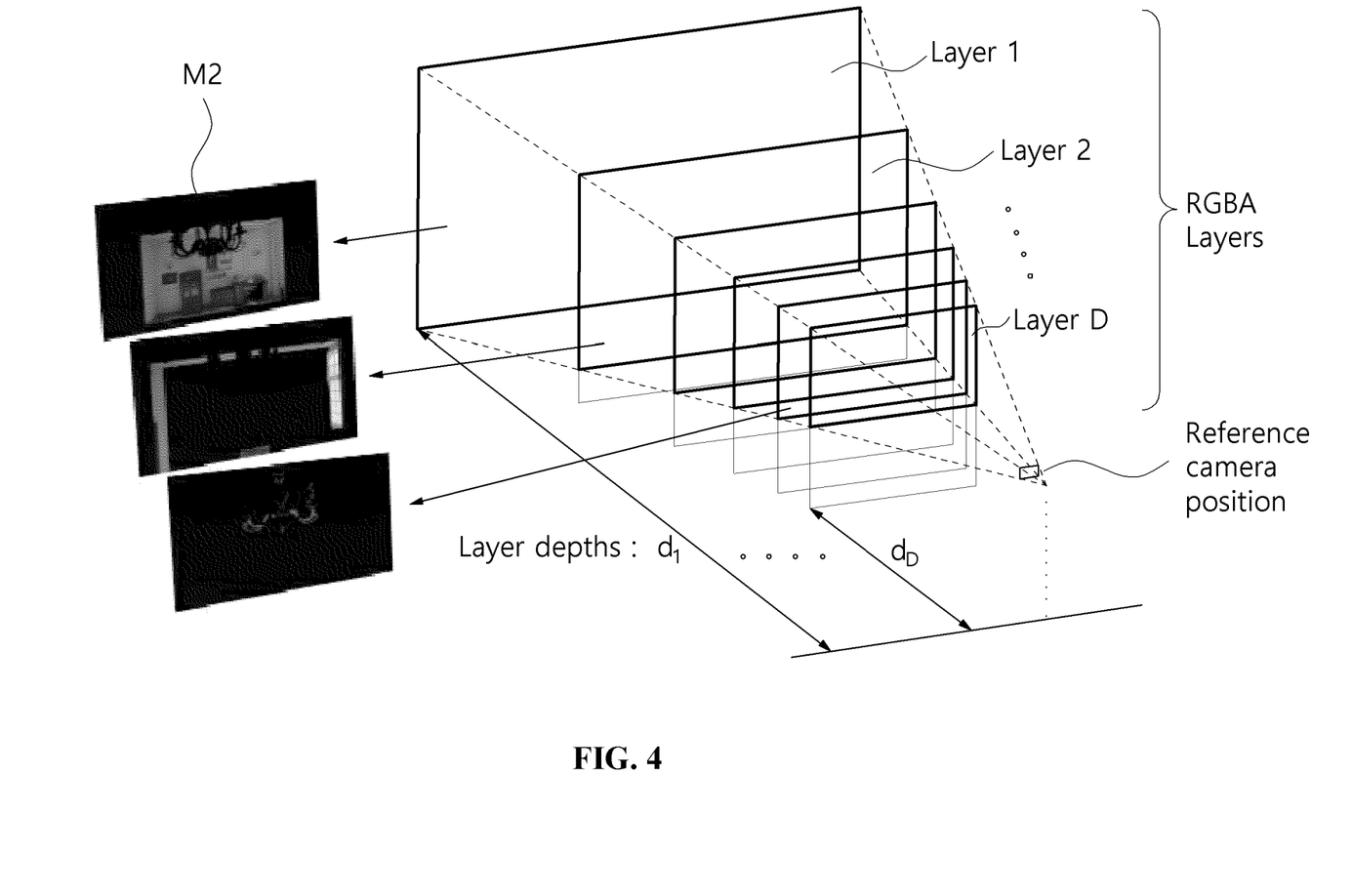
FIG. 4 is a diagram illustrating the state of conversion into a multi-plane image according to an embodiment.

FIG. 4 is a diagram illustrating the state of conversion into a multi-plane image according to an embodiment.

As illustrated in FIG. 4, multi-plane 3D data (a multi-plane image) M2 may be represented in a 3D space in such a way as to generate planes for respective distances in a depth direction at a specific reference camera position and rearrange corresponding pixel values (RGB) and transparency values (alpha values) of the corresponding pixels, for respective planes. That is, for the multi-plane image, an image at an arbitrary camera position may be freely generated.

Referring back to FIG. 2, the image conversion apparatus according to the embodiment may generate an aggregated layer by aggregating layers of the multi-plane image into at least one layer at step S200.

Figure 5:
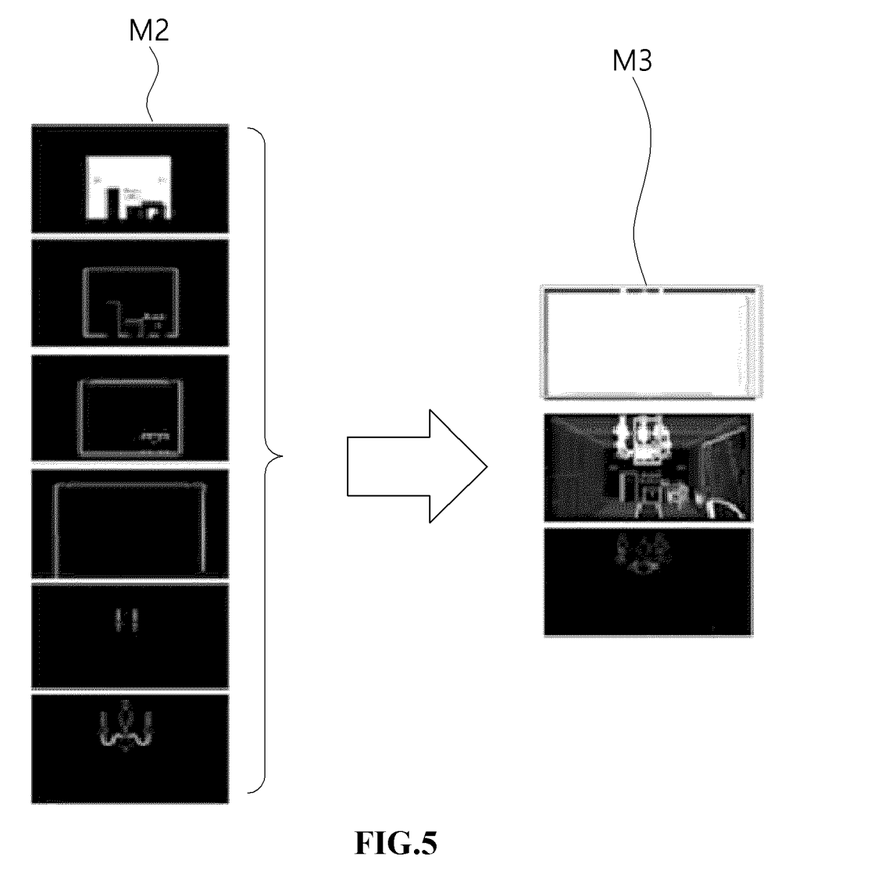
FIG. 5 is a diagram illustrating an example in which a conventional multi-plane image is compared with a multi-plane image according to an embodiment.

FIG. 5 is a diagram illustrating an example in which a conventional multi-plane image (MPI) is compared with a multi-plane image according to an embodiment.

As illustrated in FIG. 5, a multi-plane image M3 for which an aggregated layer is generated may be integrated using a smaller number of layers compared to the conventional multi-plane image. A process of generating an aggregated layer will be described in detail below with reference to FIG. 6.

Figure 6:
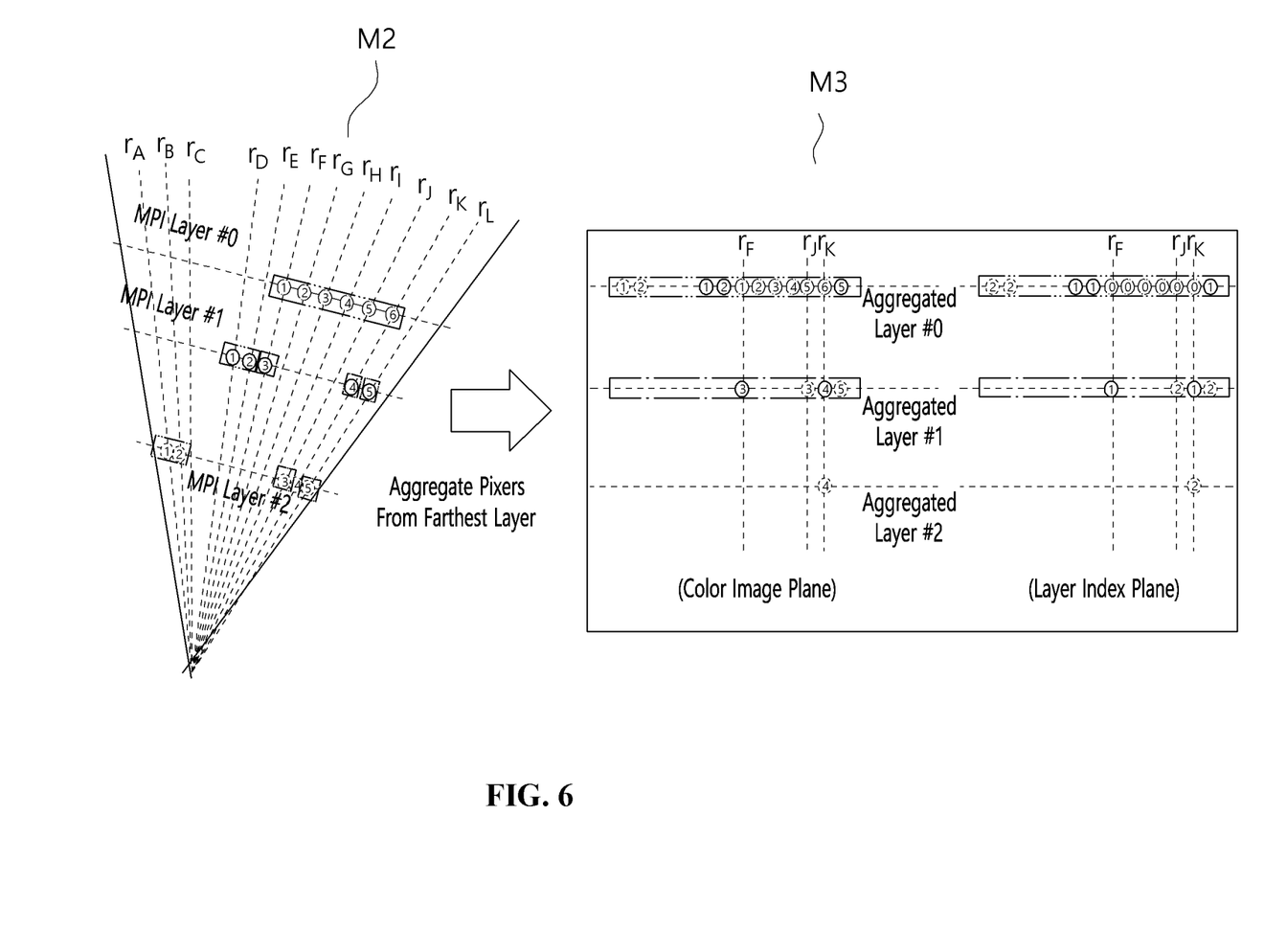
FIG. 6 is a diagram illustrating a process of generating an aggregated layer for a multi-plane image according to an embodiment.

FIG. 6 is a diagram illustrating a process of generating an aggregated layer for a multi-plane image according to an embodiment.

As illustrated in FIG. 6, aggregation may be performed in the order from the deepest layer, that is, a layer farthest from a camera (e.g., MPI Layer #0) to a layer closer to the camera (e.g., MPI Layer #2), among multiple layers (e.g., MPI Layer #0, MPI Layer #1, MPI Layer #2, etc.) of a multi-plane image M2.

That is, when the origin of the camera is viewed from the deepest layer (i.e., MPI Layer #0), among the layers, pixels that are seen first for respective identical pixel coordinates may be aggregated, and then a first aggregated layer (Aggregated Layer #0) may be generated.

In the layer images of the multi-plane image M2, the identical pixel coordinates (x, y) between the layer images may be points passing by the same ray from the origin of the camera. Pixels that are seen first when the origin of the camera is viewed from the farthest layer for respective rays $(r_A, \ldots, r_L)$ may be aggregated into one layer, and thus an aggregated layer may be generated.

For example, the aggregated layer may be generated in the order in which, for ray $r_A$, pixel #1 of MPI Layer #2 is the pixel first meeting ray $r_A$, for ray $r_B$, pixel #2 of MPI Layer #2 is the pixel first meeting ray $r_B$, for ray $r_D$, pixel #1 of MPI Layer #1 is the pixel first meeting ray $r_D$, and for ray $r_F$, pixel #1 of MPI Layer #0 is the pixel first meeting ray $r_F$.

As described above, the result of gathering the pixels first meeting respective rays from behind the rays into one layer image may mean a first aggregated layer (Aggregated Layer #0), which is aggregated layer #0 on the right side of the drawing. Here, a multi-plane image M3 for which aggregated layers are generated may be composed of a color image plane (i.e., a color image) and a layer index plane (i.e., a layer index image). The color image may have color values of the gathered pixels, and the layer index image may retain a layer index indicating the layer of the original multi-plane image from which the corresponding pixel is originated. Here, the color image may contain a transparency image, and may have the transparency value of the corresponding pixel.

Similar to the method, when the origin of the camera is viewed from the second-deepest layer among the layers, a second aggregated layer (Aggregated Layer #1) may be generated from pixels that are seen first for respective identical pixel coordinates with the exception of pixels included in the first aggregated layer (Aggregated Layer #0).

As described above, aggregated layers may be generated in the order of shorter distances in a depth direction with respect to the layers. The generation of aggregated layers may be repeated until no pixel remains in the multi-plane image M2.

In FIG. 6, when three aggregated layers are generated through the process of generating aggregated layers, all pixels in the multi-plane image may be accommodated.

Referring back to FIG. 2, the image conversion apparatus according to the embodiment may convert a multi-plane image (MPI) having aggregated layers into a 2D atlas image at step S300.

Figure 7:
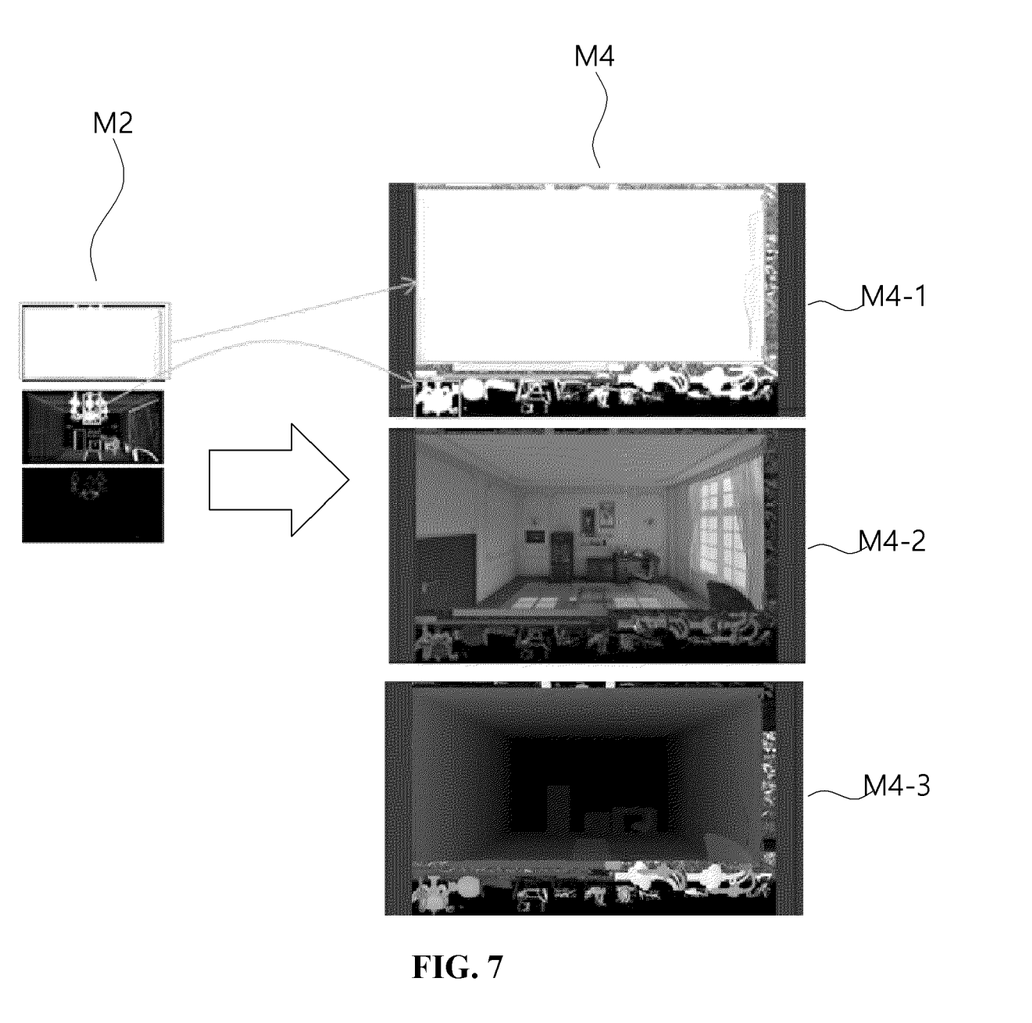
FIG. 7 is a diagram illustrating the state in which a multi-plane image is converted into a 2D atlas image according to an embodiment.

FIG. 7 is a diagram illustrating the state in which a multi-plane image is converted into a 2D atlas image according to an embodiment.

As illustrated in FIG. 7, the image conversion apparatus according to the embodiment may convert the multi-plane image into a 2D atlas image by rearranging regions in which a pixel is present in all aggregated layers of the multi-plane image in a single image.

The multi-plane image may be converted into the 2D atlas image by condensing a transparency image and a color image of the multi-plane image M3 having aggregated layers into a single image. In this case, the layer index image of the multi-plane image may be taken without change. Accordingly, the 2D atlas image may include a transparency image M4-1, a color image M4-2, and a layer index image M4-3.

An embodiment may reduce the number of aggregated layers of the multi-plane image by maximally gathering pixel-presence regions (patch regions) of respective layers of an initial multi-plane image M2 on one layer, within a range in which the pixel-presence regions (patch regions) do not overlap each other, and may greatly reduce empty regions in the 2D atlas image upon configuring the 2D atlas image by increasing the pixel-presence regions on each aggregated layer.

Referring back to FIG. 2, the image conversion apparatus according to an embodiment may compress the 2D atlas image at step S400.

The image conversion apparatus according to the embodiment may compress the 2D atlas image using one of compression methods such as High Efficiency Video Coding (HEVC), H.263, and Versatile Video Coding (VVC), and may generate bitstream data as a result of the compression.

The image conversion apparatus according to the embodiment may reconstruct a multi-view image using the compressed bitstream data.

For example, the image conversion apparatus according to the embodiment may receive compressed bitstream data, may restore a 2D atlas image from the compressed bitstream data, and may reconstruct a multi-plane image from the restored 2D atlas image. By utilizing the reconstructed multi-plane image, images at arbitrary views may be freely generated.

The image conversion apparatus according to the present invention may be implemented in a computer system, such as a computer-readable storage medium.

Figure 8:
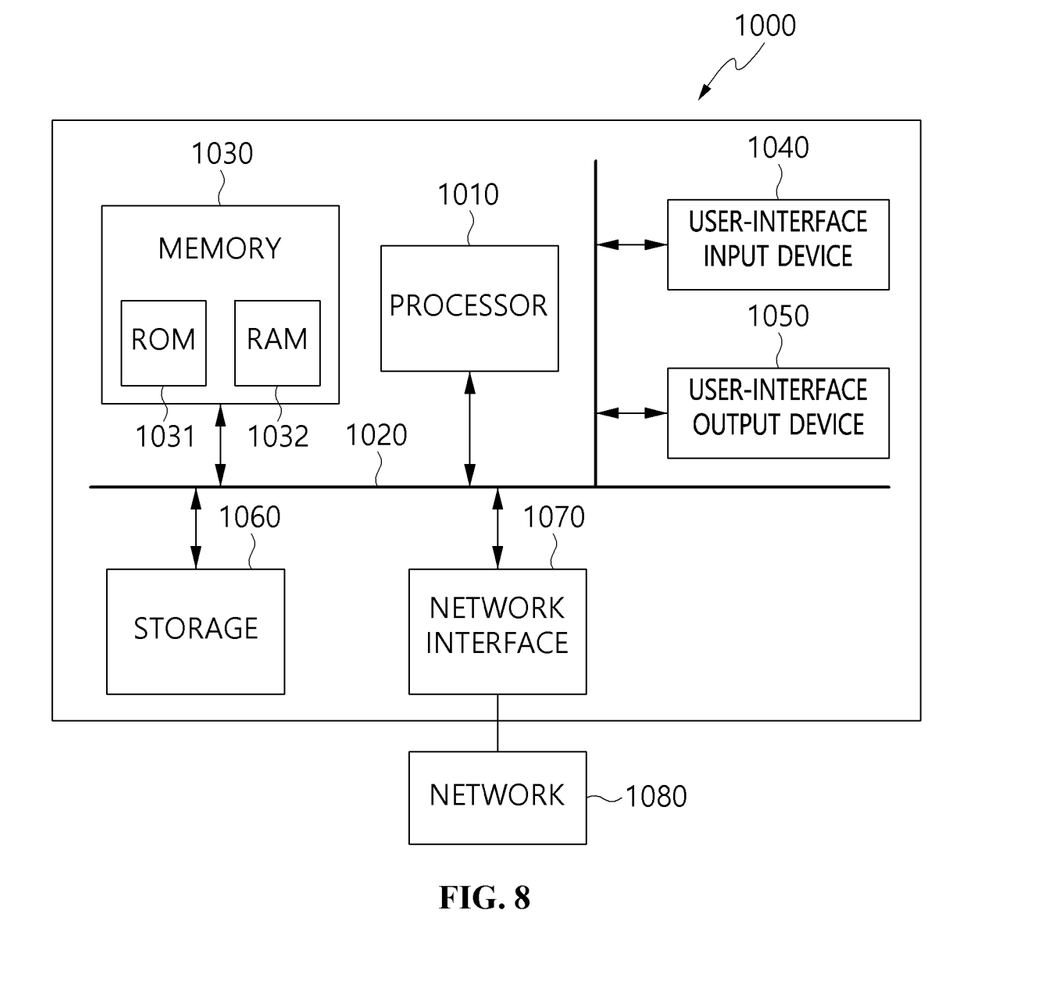
FIG. 8 is a block diagram illustrating the configuration of a computer system according to an embodiment.

FIG. 8 is a block diagram illustrating the configuration of a computer system according to an embodiment.

A computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080.

Each processor 1010 may be a Central Processing Unit (CPU) or a semiconductor device for executing programs or processing instructions stored in the memory 1030 or the storage 1060. The processor 1010 may be a kind of CPU, and may control the overall operation of the image conversion apparatus.

The processor 1010 may include all types of devices capable of processing data. The term processor as herein used may refer to a data-processing device embedded in hardware having circuits physically constructed to perform a function represented in, for example, code or instructions included in the program. The data-processing device embedded in hardware may include, for example, a microprocessor, a CPU, a processor core, a multiprocessor, an application-specific integrated circuit (ASIC), a field-programmable gate array (FPGA), etc., without being limited thereto.

The memory 1030 may store various types of data for the overall operation such as a control program for performing the image conversion method according to the embodiment. In detail, the memory 1030 may store multiple applications executed by the image conversion apparatus, and data and instructions for the operation of the image conversion apparatus.

Each of the memory 1030 and the storage 1060 may be a storage medium including at least one of a volatile medium, a nonvolatile medium, a removable medium, a non-removable medium, a communication medium, an information delivery medium or a combination thereof. For example, the memory 1030 may include Read-Only Memory (ROM) 1031 or Random Access Memory (RAM) 1032.

In accordance with an embodiment, a computer-readable storage medium for storing a computer program may include instructions enabling the processor to perform a method including operations at the steps of generating a multi-plane image reconfigured into layers in a depth direction based on multiple pieces of multi-view image data, generating an aggregated layer by aggregating the layers of the multi-plane image into at least one layer, and converting a multi-plane image including the aggregated layer into a two-dimensional (2D) atlas image.

In accordance with an embodiment, a computer program stored in a computer-readable storage medium may include instructions enabling the processor to perform a method including operations at the step of generating a multi-plane image reconfigured into layers in a depth direction based on multiple pieces of multi-view image data, generating an aggregated layer by aggregating the layers of the multi-plane image into at least one layer, and converting a multi-plane image including the aggregated layer into a two-dimensional (2D) atlas image.

The particular implementations shown and described herein are illustrative examples of the present invention and are not intended to limit the scope of the present invention in any way. For the sake of brevity, conventional electronics, control systems, software development, and other functional aspects of the systems may not be described in detail. Furthermore, the connecting lines or connectors shown in the various presented figures are intended to represent exemplary functional relationships and/or physical or logical couplings between the various elements. It should be noted that many alternative or additional functional relationships, physical connections, or logical connections may be present in an actual device. Moreover, no item or component may be essential to the practice of the present invention unless the element is specifically described as "essential" or "critical".

According to the present invention, the size of a 2D atlas image may be reduced by aggregating respective layers of multi-plane image.

Further, the present invention may improve compression efficiency by minimizing the number of empty spaces in which no patch region is contained in a 2D atlas image.

Therefore, the spirit of the present invention should not be limitedly defined by the above-described embodiments, and it is appreciated that all ranges of the accompanying claims and equivalents thereof belong to the scope of the spirit of the present invention.

What is claimed is:

1. An image conversion method comprising:
   generating a multi-plane image reconfigured into layers in a depth direction based on multiple pieces of multi-view image data;
   generating an aggregated layer by aggregating the layers of the multi-plane image into at least one layer such that respective regions of pixels on each layer are packed into the at least one aggregated layer without overlapping between the respective regions of pixels; and
   converting a multi-plane image including the aggregated layer into a two-dimensional (2D) atlas image.

2. An image conversion method comprising:
   generating a multi-plane image reconfigured into layers in a depth direction based on multiple pieces of multi-view image data;
   generating an aggregated layer by aggregating the layers of the multi-plane image into at least one layer; and
   converting a multi-plane image including the aggregated layer into a two-dimensional (2D) atlas image,
   wherein the generating of the aggregated layer comprises:
   generating a first aggregated layer from pixels that are seen first for respective identical pixel coordinates when an origin of a camera is viewed from a deepest layer among the layers; and
   generating a second aggregated layer from pixels that are seen first for respective identical pixel coordinates, with exception of pixels included in the first aggregated layer, when the origin of the camera is viewed from a second-deepest layer among the layers.

3. The image conversion method of claim 2, wherein the generating of the aggregated layer is terminated when no pixel is present in each of the layers.

4. The image conversion method of claim 2, wherein the 2D atlas image includes a transparency image and a color image, which are generated based on pixel information of respective aggregated layers of the multi-plane image, and a layer index image having position information of the pixels on the layers.

5. The image conversion method of claim 1, further comprising:
   compressing the 2D atlas image.

6. The image conversion method of claim 5, wherein bitstream data is generated from the 2D atlas image using High Efficiency Video Coding (HEVC), H.263, or Versatile Video Coding (VVC).

7. The image conversion method of claim 1, wherein the multiple pieces of multi-view image data include image data having a 2D array.

8. The image conversion method of claim 1, wherein the multi-plane image is generated by generating planes for respective distances in a depth direction and rearranging corresponding pixel values and transparency values of pixels, for respective planes.

9. An image conversion apparatus comprising:
   a memory configured to store a control program for image conversion; and
   a processor configured to execute the control program stored in the memory,
   wherein the processor is configured to:
   generate a multi-plane image reconfigured into layers in a depth direction based on multiple pieces of multi-view image data, generate an aggregated layer by aggregating the layers of the multi-plane image into at least one layer such that respective regions of pixels on each layer are packed into the at least one aggregated layer without overlapping between the respective regions of pixels, and convert a multi-plane image including the aggregated layer into a two-dimensional (2D) atlas image.

10. The image conversion apparatus of claim 9, wherein the processor is configured to generate a first aggregated layer from pixels that are seen first for respective identical pixel coordinates when an origin of a camera is viewed from a deepest layer among the layers and to generate a second aggregated layer from pixels that are seen first for respective identical pixel coordinates, with exception of pixels included in the first aggregated layer, when the origin of the camera is viewed from a second-deepest layer among the layers.

11. The image conversion apparatus of claim 10, wherein the processor is configured to terminate generation of the aggregated layer when no pixel is present in each of the layers.

12. The image conversion apparatus of claim 10, wherein the 2D atlas image includes a transparency image and a color image, which are generated based on pixel information of respective aggregated layers of the multi-plane image, and a layer index image having position information of the pixels on the layers.

13. The image conversion apparatus of claim 9, wherein the processor is configured to compress the 2D atlas image.

14. The image conversion apparatus of claim 13, wherein the processor is configured to generate bitstream data from the 2D atlas image using High Efficiency Video Coding (HEVC), H.263, or Versatile Video Coding (VVC).

15. The image conversion apparatus of claim 9, wherein the multiple pieces of multi-view image data include image data having a 2D array.

16. The image conversion apparatus of claim 9, wherein the processor is configured to generate the multi-plane image by generating planes for respective distances in a depth direction and rearranging corresponding pixel values and transparency values of pixels, for respective planes.

* * * * *